United States Patent
Austern et al.

(10) Patent No.: US 11,263,265 B1
(45) Date of Patent: Mar. 1, 2022

(54) LABEL PROPAGATION IN A DISTRIBUTED SYSTEM

(71) Applicant: Google LLC, Mountain View, CA (US)

(72) Inventors: Matthew H. Austern, Palo Alto, CA (US); James C. Dehnert, Palo Alto, CA (US); Aart J. C. Bik, Union City, CA (US); Grzegorz J. Czajkowski, Redwood City, CA (US); Grzegorz Malewicz, Menlo Park, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 16/707,033

(22) Filed: Dec. 9, 2019

Related U.S. Application Data

(63) Continuation of application No. 15/594,888, filed on May 15, 2017, now Pat. No. 10,504,255, which is a continuation of application No. 14/339,040, filed on Jul. 23, 2014, now Pat. No. 9,652,876, which is a continuation of application No. 13/452,275, filed on Apr. 20, 2012, now Pat. No. 8,793,283.

(60) Provisional application No. 61/483,183, filed on May 6, 2011, provisional application No. 61/477,559, filed on Apr. 20, 2011.

(51) Int. Cl.
  *G06F 16/901* (2019.01)
  *G06F 16/22* (2019.01)
  *G06F 16/23* (2019.01)

(52) U.S. Cl.
  CPC ...... *G06F 16/9024* (2019.01); *G06F 16/2282* (2019.01); *G06F 16/23* (2019.01); *G06F 16/2365* (2019.01)

(58) Field of Classification Search
  CPC .. G06F 16/2282; G06F 16/23; G06F 16/2365; G06F 16/27; G06F 16/9024
  See application file for complete search history.

(56) References Cited

U.S. PATENT DOCUMENTS

| | | | |
|---|---|---|---|
| 5,734,833 | A | 3/1998 | Chiu et al. |
| 7,392,258 | B2 | 6/2008 | Bogner et al. |
| 8,429,110 | B2 | 4/2013 | Cai et al. |

(Continued)

OTHER PUBLICATIONS

Malewicz, G., et al., "Pregel: A System for Large-Scale Graph Processing," in Comm. ACM SIGMODIPOD, Indianapolis, Indiana, Jun. 6-10, 2010, 11 pages. (Year: 2010).*

(Continued)

*Primary Examiner* — Scott A. Waldron
(74) *Attorney, Agent, or Firm* — Honigman LLP; Brett A. Krueger

(57) ABSTRACT

Data are maintained in a distributed computing system that describe a graph. The graph represents relationships among items. The graph has a plurality of vertices that represent the items and a plurality of edges connecting the plurality of vertices. At least one vertex of the plurality of vertices includes a set of label values indicating the at least one vertex's strength of association with a label from a set of labels. The set of labels describe possible characteristics of an item represented by the at least one vertex. At least one edge of the plurality of edges includes a set of label weights for influencing label values that traverse the at least one edge. A label propagation algorithm is executed for a plurality of the vertices in the graph in parallel for a series of synchronized iterations to propagate labels through the graph.

17 Claims, 7 Drawing Sheets

(56) References Cited

U.S. PATENT DOCUMENTS

| | | | |
|---|---|---|---|
| 8,458,229 | B2 | 6/2013 | Oliver et al. |
| 2006/0212860 | A1 | 9/2006 | Benedikt et al. |
| 2008/0097941 | A1 | 4/2008 | Agarwal |
| 2008/0216077 | A1 | 9/2008 | Emani et al. |
| 2008/0271022 | A1 | 10/2008 | Strassner et al. |
| 2008/0275861 | A1* | 11/2008 | Baluja .................. G06N 5/02 |
| | | | 707/999.005 |
| 2009/0055343 | A1 | 2/2009 | Van Lunteren |
| 2010/0017537 | A1 | 1/2010 | Linnartz |
| 2010/0241827 | A1 | 9/2010 | Yu et al. |
| 2011/0252034 | A1 | 10/2011 | Padovitz et al. |
| 2011/0307436 | A1 | 12/2011 | Cai et al. |
| 2011/0314075 | A1 | 12/2011 | Boldyrev et al. |

OTHER PUBLICATIONS

"Microsoft Computer Dictionary", (2002), Microsoft Press, 5th Ed., p. 335. (Year: 2002).*

Anderson, T., et al., "High-Speed Switch Scheduling for Local-Area Networks," ACM Trans. Compo Syst. 11(4): 319-352, 1993.

Bader, D., et al., "Designing Multithreaded Algorithms for Breadth-First Search and st-connectivity on the Cray MTA-2," in Proc. 35th Intl. Conf. on Parallel Processing (ICPP'06), Columbus, Ohio, Aug. 2006, pp. 523-530.

Barroso, L., et al., "Web search for a planet: The Google Cluster Architecture," IEEE Micro 23(2):22-28, 2003.

Bayati, M., et al., "Maximum Weight Matching via Max-Product Belief Propagation," in Proc. IEEE Intl. Symp. on Information Theory, pp. 1763-1767, 2005.

Bellman, R., "On a routing problem," Quarterly of Applied Mathematics 16(1):87-90, 1958.

Bonorden, O., et al., "The Paderborn University BSP (PUB) library," Parallel Computing 29:187-207, 2003.

Brin, S., et al., "The Anatomy of a Large-Scale Hypertextual Web Search Engine," in Proc. 7th Intl. Conf. on the World Wide Web, pp. 107-117, 1998.

Chan, A., et al., "CGMGRAPH/CGMLIB: Implementing and Testing CGM Graph Algorithms on PC Clusters and Shared Memory Machines," Intl. J. of High Performance Computing Applications 19(1):81-97, 2005.

Chang, F., et al., "Bigtable: A Distributed Storage System for Structured Data," ACM Trans. Compo Syst. 26(2) Article 4, 26 pages, 2008.

Cherkassky, B., et al., "Shortest paths algorithms: Theory and experimental evaluation," Mathematical Programming 73:129-174, 1996.

Cohen, J., "Graph Twiddling in a MapReduce World," Compo in Science & Engineering, pp. 29-41, Jul./Aug. 2009.

Crobak, J., et al., "Advanced Shortest Paths Algorithms on a Massively-Multithreaded Architecture," in Proc. First Workshop on Multithreaded Architectures and Applications, pp. 1-8, 2007.

Czajkowski, G., "Large-scale graph computing at Google," Google Research Admin., Jun. 2009, 1 page, [online] [retrieved Jul. 20, 2012] retrieved from the internet <http://qooqleresearch.bloqspot.com/2009/06/larqe-scale-qraph-computinq-at-qooqle.html>.

D. Rao and D. Yarowsky, "Ranking and Semi-supervised Classification on large scale graphs using map-reduce", 2009, proceedings of the 2009, ACL-IJCNLP 2009, pp. 58-65.

Daly, J., "A higher order estimate of the optimum checkpoint interval for restart dumps," Future Generation Computer Systems 22:303-312, 2006.

Dean, J., et al., "MapReduce: Simplified Data Processing on Large Clusters," in Proc. 6th USENIX Symp. on Operating Syst. Design and Impl., pp. 137-150, 2004.

Dijkstra, E., et al., "A Note on Two Problems in Connexion with Graphs," Numerische Mathematik 1:269-271, 1959.

Erwig, M., "Inductive graphs and functional graph algorithms," J. Functional Programming 11(5):467-492, Sep. 2001.

F. Kang, R. Jin, and R. Sukthankar, "Correlated Label Propagation with Application to Multi-label Learning", 2006, Proceedings of the 2006 IEEE CVPR '06, pp. 1719-1726.

Ghemawat, S., et al., "The Google File System," in Proc. 19th ACM Symp. on Operating Syst. Principles, pp. 29-43, 2003.

Google Project Hosting, "Protobuf: Protocol Buffers—Google's data interchange format," 2 pages, [online] retrieved Jul. 20, 2012, retrieved from the internet <http://code.qooqle.eom/p/protobuf/ 2009>.

Goudreau, M., et al., "Portable and Efficient Parallel Computing Using the BSP Model," IEEE Transactions on Computers 48(7): 670-689, 1999.

Gregor, D., et al., "Lifting Sequential Graph Algorithms for Distributed-Memory Parallel Computation," in Proc. of Parallel Object-Oriented Scientific Computing (POOSC), 15 pages, Jul. 2005.

Gregor, D., et al., "The Parallel BGL: A Generic Library for Distributed Graph Computations," in Proc. 2005 ACM SIGPLAN Conf. on Object-Oriented Prog., Syst, Lang., and Applications (OOPSLA'05), pp. 423-437, Oct. 2005.

Hagberg, A., et al., "Exploring Network Structure, Dynamics, and Function using NetworkX," in Proc. 7th Python in Science Conf., pp. 11-15, 2008.

Hill, J., et al., "BSPlib: The BSP programming library," Parallel Computing 24:1947-1980, 1998.

Isard, M., et al., "Dryad: Distributed Data-Parallel Programs from Sequential Building Blocks," in Proc. European Conf. on Computer Syst., pp. 59-72, 2007.

Kang, U., et al., "PEGASUS: A Peta-Scale Graph Mining System—Implementation and Observations," in Proc. Intl. Conf. Data Mining, pp. 229-238, 2009.

Lumsdaine, A., et al., "Challenges in Parallel Graph Processing," Parallel Processing Letters 17:5-20, 2007.

Madduri, K., et al., "A Faster Parallel Algorithm and Efficient Multithreaded Implementations for Evaluation Betweenness Centrality on Massive Datasets," in Proc. 3m Workshop on Multithreaded Architectures and Applications (MTAAP'09), Rome, Italy, May 2009, 8 pages.

Madduri, K., et al., "Parallel Shortest Path Algorithms for Solving Large-Scale Instances," DIMACS Implementation Challenge—The Shortest Path Problem, 39 pages, 2006.

Malewicz, G., "A Work-Optimal Deterministic Algorithm for the Certified Write-All Problem with a Nontrivial Number of Asynchronous Processors," SIAM J. Comput. 34(4):993-1024, 2005.

Malewicz, G., et al., "Pregel: A System for Large-Scale Graph Processing," in Comm ACM SIGMODIPOD, Indianapolis, Indiana, Jun. 6-10, 2010, 11 pages.

Meyer, U., et al., "Design and Implementation of a Practical I/O-efficient Shortest Paths Algorithm," in Proc. 3rd Workshop on Multithreaded Architectures and Applications (MTAAP'09), Rome, Italy, May 2009, 12 pages.

Meyer, U., et al., "i1-stepping: a parallelizable shortest path algorithm," Journal of Algorithms 49:114-152, 2003.

Munagala, K., et al., "I/O-Complexity of Graph Algorithms," in Proc. 10th Annual ACM-SIAM Symp. on Discrete Algorithms, pp. 687-694, 1999.

Olston, C., et al., "Pig Latin: A Not-So-Foreign Language for Data Processing," in Proc. ACM SIGMOD Intl. Conf. on Management of Data, pp. 1 099-111 0, 2008.

Pike, R., et al., "Interpreting the data: Parallel analysis with Sawzall," Scientific Programming 13(4):277-298, 2005.

Rodriguez et al., "Constructions from Dots and Lines", Bulletin of the American Society for Information Science and Technology, vol. 36, No. 6, dated Aug. 2010, pp. 35-41.

Thorup, M., "Undirected Single-Source Shortest Paths with Positive Integer Weights in Linear Time," J. ACM 46(3):362-394, May 1999.

Valiant, L., "A Bridging Model for Parallel Computation," Comm. ACM 33(8):103-111, 1990.

Wikipedia, "Bulk synchronous parallel," 3 pages, [online] [retrieved on Mar. 10, 2010] retrieved from the internet <http://en.wikipedia. or!=)/w/index.php?title=Bulk synchronous parallel&0Idid= 349030784>.

(56) References Cited

OTHER PUBLICATIONS

Wikipedia, "Distributed computing," 8 pages, [online] [retrieved Mar. 23, 2010] retrieved from the internet <http://en.wikipedia.org/w/index.php?title=Distributed computing&0Idid=351626983>.

Yoo, A., et al., "A Scalable Distributed Parallel Breadth-First Search Algorithm on BlueGene/L," in Proc. 2005 ACM/IEEE Conf. on Supercomputinq (SC'05), pp. 25-43, 2005.

Yu, Y., et al., "DryadLINQ: A System for General Purpose Distributed Data-Parallel Computing Using a High-Level Language," in Proc. 8th USENIX Symp. on Operating Syst. Design and Implementation, pp. 10-14, 2008.

Ziv, A., et al., "An On-Line Algorithm for Checkpoint Placement," IEEE Transactions on Computers 46(9):976-985, Sep. 1997.

\* cited by examiner

LABEL PROPAGATION IN A DISTRIBUTED SYSTEM

CROSS-REFERENCE TO RELATED APPLICATIONS

This application is a continuation of U.S. application Ser. No. 15/594,888, filed May 15, 2017, which is a continuation of U.S. application Ser. No. 14/339,040, filed Jul. 23, 2014, which is a continuation of U.S. application Ser. No. 13/452,275, filed Apr. 20, 2012, which claims the benefit of U.S. Provisional Application No. 61/477,559, filed Apr. 20, 2011, and U.S. Provisional Application No. 61/483,183, filed May 6, 2011, each of which is hereby incorporated herein by reference.

BACKGROUND

Technical Field

This disclosure pertains in general to distributed computing and in particular to using a distributed computing system to propagate labels in a graph.

Background Information

In graph processing, a computing problem is represented by a graph having a set of vertices connected by a set of edges. The graph can be used, for example, to model a real-world condition, and then the graph processing can act on the graph to analyze the modeled condition. For example, the World Wide Web can be represented as a graph where web pages are vertices and links among the pages are edges. In this example, graph processing can analyze the graph to provide information to a search engine process that ranks search results. Similarly, a social network can be represented as a graph, and graph processing can analyze the graph to learn about the relationships in the social network. Graphs can also be used to model transportation routes, paths of disease outbreaks, citation relationships among published works, and similarities among different documents. Additionally, graphs can be used for machine learning techniques that observe patterns in data in order to adjust future behaviors, such as for spam detection.

Modeling real-world conditions such as those mentioned above involves representing a great deal of information within the graph, as well as updating the graph as processing is performed or new information is received. For graphs modeling complex conditions, representing and updating the information requires significant computing resources.

SUMMARY OF THE DISCLOSURE

The above and other needs are met by a method, a non-transitory computer-readable storage medium and a system for a label propagation algorithm. Embodiments of the method comprise maintaining data in a distributed computing system. The data describe a graph that represents relationships among items. The graph includes a plurality of vertices that represent the items and a plurality of edges that connect the plurality of vertices and represent the relationships among the items. At least one vertex of the plurality of vertices includes a set of label values that indicate the at least one vertex's strength of association with a label from a set of labels. The set of labels describe possible characteristics of an item represented by the at least one vertex. At least one edge of the plurality of edges includes a label weight for influencing label values that traverse the at least one edge. The method includes executing a label propagation algorithm for the plurality of vertices in the graph in parallel for a series of synchronized iterations to propagate labels through the graph. The operations of the label propagation algorithm for a respective vertex include receiving a message that includes a weighted label value. The operations of the label propagation algorithm for the respective vertex include updating a label value for a first label in the set of labels of the vertex based on the weighted label value included in the received message to produce an updated label value. The operations of the label propagation algorithm for the respective vertex include sending a message to a target vertex connected to the vertex by an edge, where the message includes a new updated label value. The new updated label value is the updated label value weighted by the label weight of the edge connecting the respective vertex to the target vertex. The method includes assigning labels from the set of labels to the plurality of vertices based on label values associated with the plurality of vertices and outputting the labels of the plurality of vertices.

Embodiments of the non-transitory computer-readable storage medium store executable computer program instructions for performing the steps described above. Embodiments of the system comprise a processor and a non-transitory computer readable storage medium storing processor-executable computer program instructions. The computer program instructions include instructions for performing the steps described above.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

The figures depict embodiments of the present disclosure for purposes of illustration only. One skilled in the art will readily recognize from the following description that alternative embodiments of the structures and methods illustrated herein may be employed without departing from the principles of the disclosure described herein.

DETAILED DESCRIPTION

Figure 1:
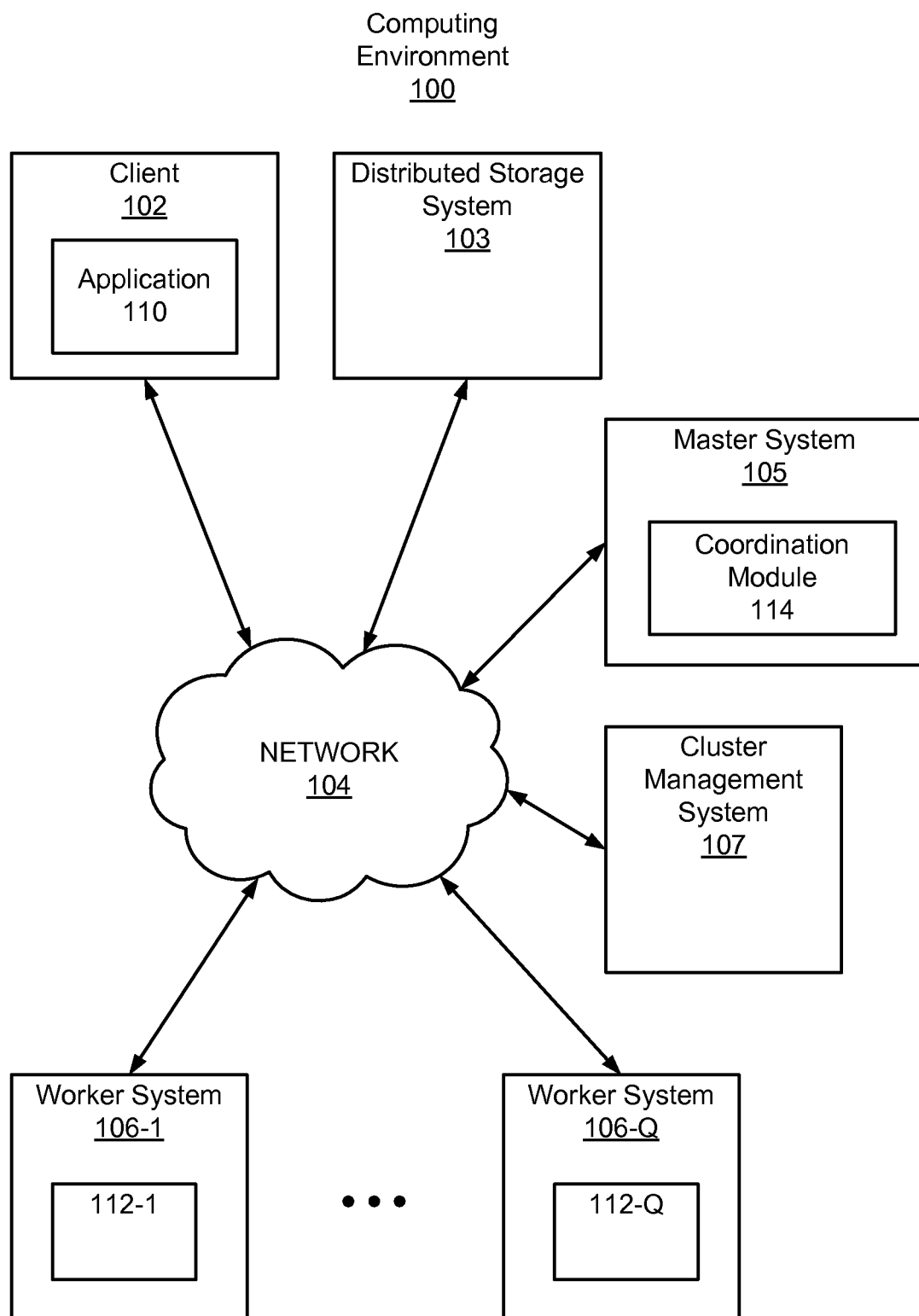
FIG. 1 is a high-level block diagram of a computing environment, according to one embodiment.

FIG. 1 is a high-level block diagram of a distributed computing environment 100 for propagating labels in a graph. FIG. 1 illustrates a client 102, a master system 105, distributed storage system 103, cluster management system 107, and worker systems 106 connected by a network 104.

Collectively, the distributed computing environment 100 may be used to define a graph modeling real-world conditions as a set of relationships among a tangible set of items, such as, for example and without limitation, documents and links on the Internet, a computer network topology, transportation routes in a geographic map, likelihoods that emails are spam, or a social graph. In addition, the computing environment 100 may be used to analyze the modeled conditions in order to solve one or more real-world problems associated with the conditions.

The definition and analysis of the real-world problem involves assigning labels to vertices in the graph and propagating values describing the labels through the graph. Once the analysis is performed, the labels of the vertices in the graph represent the solution to the modeled real-world problem. For example, if part of the analysis involves clustering together real-world items represented by the vertices of the graph that have similar characteristics, a cluster may be represented by the vertices that have the same label after the analysis is performed.

In an embodiment described herein, the distributed computing environment 100 applies a label propagation algorithm to the graph. The label propagation algorithm uses parallelism provided by the distributed computing environment 100 to propagate labels through the graph. The distributed computing system, and algorithm, thus enable identification of solutions to the real-world problems associated with the conditions modeled by the graph in a more efficient manner than would otherwise be possible.

At a high-level, the client 102 is used to provide the location of graph data describing the graph and to specify one or more algorithms to be performed on the graph data. Assume for purposes of this discussion that the algorithms include a label propagation algorithm. In an embodiment, the graph is represented as a set of vertices connected by a set of directed edges. In an embodiment, the edges may not be directed. The graph data describing the graph may be stored on the distributed storage system 103. The master system 105 assigns partitions of the graph data to the worker systems 106. In some embodiments, the worker systems 106 may retrieve and store copies of their assigned graph partitions. The worker systems 106 execute the algorithm to propagate labels throughout the partitions of the graph within their respective ambits.

In more detail, the client 102 specifies a graph in which each vertex is uniquely identified by a string vertex identifier. For example, the client 102 may provide information identifying the location of the graph on the distributed storage system 103 that is connected to the network 104. The graph may be a directed graph or an undirected graph. In addition, the client 102 specifies a set of labels that may be applied to the vertices. In one embodiment, the client 102 assigns labels to some vertices while leaving the rest of the unlabeled vertices to be labeled by the label propagation algorithm. In one embodiment, the client 102 specifies a set of label values for some of the vertices. The label values for a given vertex measure that vertex's associations with the labels in the set.

The directed edges are associated with their source vertices, and each edge has a label weight and a target vertex identifier. The label weight indicates how much the source vertex's labels affect the target vertex's labels. In some embodiments, an edge has a plurality of label weights, where each label weight corresponds to a respective label. Vertices communicate directly with one another by sending messages along the directed edges. A message may instruct the target vertex to update its labels based on the values of the source vertex's labels and the label weight of the edge connecting the vertices.

An exemplary computation includes initialization of a graph and execution of the algorithm of the user program on multiple systems. The algorithm performs a sequence of supersteps or iterations separated by global synchronization points until the algorithm terminates and produces an output. A superstep is an iteration of the computation that includes ordered stages of computation for each vertex in the graph. Within each superstep, the vertices compute in parallel, each executing a function defined in the user program that expresses the logic of an algorithm. A vertex can modify its state or that of its outgoing edges, receive messages sent to it in the previous superstep, send messages to other vertices (to be received in the next superstep), or even mutate the topology of the graph.

The algorithm terminates when every vertex votes to halt. In superstep 0 (the initial superstep), every vertex is in the active state; all active vertices participate in the computation of any given superstep. A vertex deactivates itself by voting to halt. Halting means that the vertex has no further work to do unless triggered externally, and that vertex will not execute in subsequent supersteps unless it receives a message. If reactivated by a message, a vertex must explicitly deactivate itself again. The algorithm as a whole terminates when all vertices are simultaneously inactive and there are no messages in transit.

The output of the algorithm is a set of values explicitly output by the vertices. The output represents a solution to the real-world problem associated with the modeled conditions involving the set of relationships among the set of items. For example, each vertex may output its name, its associated labels, and its values for the labels. The labels may represent a solution to the problem described as a clustering of real-world entities that have one or more labels in common, a set of weighted features in a classifier or other machine-learning system, a set of web pages on the Internet having a given set of characteristics, etc.

Turning now to the specific entities illustrated in FIG. 1, the client 102 is a computing device with a processor and a memory that includes an application 110 for providing the master system 105 and/or the cluster management system 107 with a user program and the location of the graph data. The user program defines an algorithm that propagates labels through a graph described by the graph data. The application 110 sends a copy of the user program to the master system 105 and/or the cluster management system 107. The application 110 also sends graph data or a location of the graph data to the master system 105.

The distributed storage system 103 includes one or more systems that may store the graph data. The distributed storage system 103 may provide the graph data to the systems connected to network 104 (i.e., client 102, master system 105, cluster management system 107, and worker system 106). In some embodiments, the graph data is stored as a plurality of graph partitions, where a graph partition stores data describing a subset of the edges and vertices of a directed graph. In one embodiment, the distributed storage system 103 stores a file for each graph partition. The distributed storage system 103 stores the solution to the label propagation algorithm which is output by the vertices of the graph. In some embodiments, the distributed system 103 stores a file per each graph partition containing the output from the vertices of the partition.

The cluster management system 107 is a computing device with a processor and a memory. In some embodiments, the cluster management system 107 receives a copy of a user program from the client 102 and sends a copy of the user program to the worker systems 106. In some embodiments, the cluster management system 107 coordinates the parallel execution of the user program on the worker systems 106 and reports the results of the execution to the client 102.

The master system 105 is likewise a computing device with a processor and a memory. In some embodiments, the master system 105 receives information identifying the graph data on the distributed storage system 103 and assigns partitions of the graph data to the worker systems 106. More specifically, the master system 106 sends each worker system 106 information that uniquely describes its assigned graph partition and information enabling the worker system 106 to obtain its assigned graph partition. For example, the master system 105 sends a worker system 106 a unique file name corresponding to its assigned graph partition and the location of the file on the distributed file system 103. A worker system 106 may be assigned one or more graph partitions.

The coordination module 114 maintains a list of worker systems 106 that participate in a computation. The worker systems 106 send registration messages to the master system 105 and the coordination module 114 registers the worker systems 106 by assigning unique identifiers to the worker systems 106. The coordination module 114 maintains a list of the registered worker systems 106 which includes the identifiers of the registered worker systems 106 and the addressing information of the registered worker systems 106. For a respective registered worker system 106, the list includes information identifying one or more assigned graph partitions. In some embodiments, the coordination module 114 sends each worker system 106 the list of the registered worker systems 106.

In some embodiments, the coordination module 114 assigns one or more partitions to each worker system 106, and sends each worker system 106 information identifying its assigned one or more partitions. A partition of a graph includes a subset of the vertices and edges of the graph. In some embodiments, the coordination module 114 determines the number of graph partitions. The number of partitions may be specified in the user program or determined by a partition function stored in the coordination module 114. For example, the default partitioning function may be a hash of a vertex identifier modulo N, where N is the number of partitions. The master system 105 may not be assigned any portion of the graph.

In some embodiments, the coordination module 114 sends each worker system 106 a copy of the user program and initiates the execution of the user program on the worker systems 106. In some embodiments, the coordination module 114 signals the beginning of a superstep. The coordination module 114 maintains statistics about the progress of a computation and the state of the graph, such as the total size of the graph, the number of active vertices, the timing of recent supersteps, and the message traffic of recent supersteps.

The coordination module 114 also handles fault tolerance. Fault tolerance is achieved through checkpointing. At the beginning of a superstep, the coordination module 114 instructs the worker systems 106 to save the state of their partitions to persistent storage, including vertex values, edge values, and incoming messages. Worker failures are detected through messages that the coordination module 114 periodically sends to the worker systems 106. If the coordination module 114 does not receive a reply message from a worker system 106 after a specified interval, the coordination module 114 marks that worker system 106 as failed. If a worker system 106 does not receive a message from the coordination module 114 after specified time interval, the worker system 106 terminates its processes. When a worker system 106 fails, the current state of the partitions assigned to the worker system 106 is lost. In order to recover from a worker system 106 failure, the coordination module 114 reassigns graph partitions to the currently available set of worker systems 106 at the beginning of a superstep. The available set of worker systems 106 reload their partition states from the most recent available checkpoint at the beginning of a superstep. The most recent available checkpoint may be several supersteps earlier than the latest superstep completed by any worker system 106 before the failure, which results in the missing supersteps being repeated. The frequency of checkpointing may be based on a mean time of failure which thereby balances check pointing cost against expected recovery cost.

After the supersteps are finished, the coordination module 114 aggregates results from the worker systems 106 and sends the results to the distributed storage system 103. In some embodiments, the results include a set of values explicitly output by the vertices. These values describe, e.g., the label values for the vertices. In some embodiments, the coordination module 114 writes one result file per graph partition and stores the result files with the graph partitions in the distributed storage system 103. The coordination module 114 sends a notification to the client 102 including the location of the results. The client 102 may then implement the solution described by the labels, or provide the solution to other systems for implementation.

A worker system 106 is a computing device with a processor and a memory. The worker systems 106 and the master system 105 are similar types of systems in one embodiment. A worker system 106 includes a worker module 112 that stores one or more graph partitions. The worker module 112 may obtain the one or more graph partitions from the distributed system 103. In some embodiments, the worker module 112 stores information identifying one or more graph partitions. In some embodiments, the worker module 112 stores one or more graph partitions. The worker module 112 also stores and executes a copy of the user program on the one or more partitions stored on the worker system 106.

The worker module 112 executes supersteps of a user program in response to receiving instructions from the master system 105 and/or cluster management system 107. During a superstep, the worker module 112 executes an algorithm for each active vertex in the one or more partitions stored on the worker module 112. A vertex that is active during a superstep may send messages to other vertices in order to obtain information about other vertices or edges, to add or remove vertices or edges, and to modify vertices or edges. During execution of a superstep, the worker module 112 may retrieve and/or modify graph data stored on the distributed storage system 103. When the superstep is finished, the worker module 112 sends a message to the master system 105 indicating the number of vertices that will be active in the next superstep. The superstep continues as long as there are active vertices or there are messages in transit. When the supersteps are finished, the worker module 112 sends the results generated from the user program to the master system 105.

The worker module 112 may store the state of its assigned one or more partitions. This may include the state of each vertex in the one or more partitions where the state of each vertex consists of its current value, a list of its outgoing edges (which includes the vertex name for the edge's destination and the edge's current value), a queue containing incoming messages, and a flag specifying whether the vertex is active.

The network 104 represents the communication pathways between the client 102, the master system 105 and the worker systems 106. In one embodiment, the network 104 uses standard Internet communications technologies and/or protocols. Thus, the network 104 can include links using technologies such as Ethernet, 802.11, integrated services digital network (ISDN), asynchronous transfer mode (ATM), etc. Similarly, the networking protocols used on the network 104 can include the transmission control protocol/Internet protocol (TCP/IP), the hypertext transport protocol (HTTP), the simple mail transfer protocol (SMTP), the file transfer protocol (FTP), etc. The data exchanged over the network 104 can be represented using technologies and/or formats including the hypertext markup language (HTML), the extensible markup language (XML), etc. In addition, all or some links can be encrypted using conventional encryption technologies such as the secure sockets layer (SSL), Secure HTTP (HTTPS) and/or virtual private networks (VPNs). In another embodiment, the entities can use custom and/or dedicated data communications technologies instead of, or in addition to, the ones described above.

Figure 2:
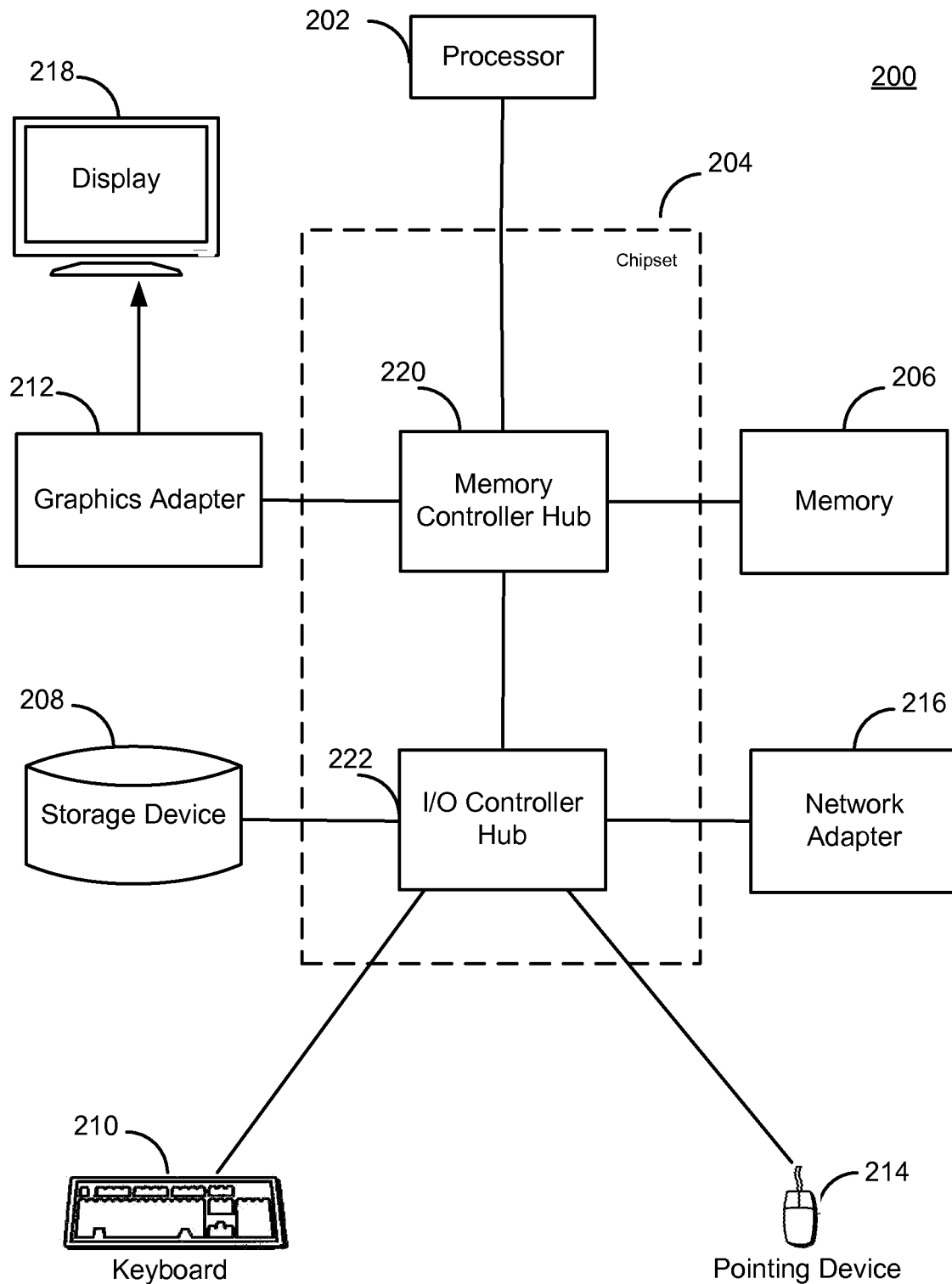
FIG. 2 is a high-level block diagram illustrating an example of a computer, according to one embodiment.

FIG. 2 is a high-level block diagram illustrating physical components of a computer 200 used as part of the client 102, master system 105 and/or worker system 106 from FIG. 1, according to one embodiment. Illustrated are at least one processor 202 coupled to a chipset 204. Also coupled to the chipset 204 are a memory 206, a storage device 208, a keyboard 210, a graphics adapter 212, a pointing device 214, and a network adapter 216. A display 218 is coupled to the graphics adapter 212. In one embodiment, the functionality of the chipset 204 is provided by a memory controller hub 220 and an I/O controller hub 222. In another embodiment, the memory 206 is coupled directly to the processor 202 instead of the chipset 204. In some embodiments, memory 206 includes high-speed random access memory, such as DRAM, SRAM, DDR RAM or other random access solid state memory devices.

The storage device 208 is any non-transitory computer-readable storage medium, such as a hard drive, compact disk read-only memory (CD-ROM), DVD, or a solid-state memory device. The memory 206 holds instructions and data used by the processor 202. The pointing device 214 may be a mouse, track ball, or other type of pointing device, and may be used in combination with the keyboard 210 to input data into the computer 200. The graphics adapter 212 displays images and other information on the display 218. The network adapter 216 couples the computer 200 to the network 140.

As is known in the art, a computer 200 can have different and/or other components than those shown in FIG. 2. In addition, the computer 200 may lack certain illustrated components. For example, in one embodiment, a computer 200 acting as a server may lack a keyboard 210, pointing device 214, graphics adapter 212, and/or display 218. Moreover, the storage device 208 can be local and/or remote from the computer 200 (such as embodied within a storage area network (SAN)).

As is known in the art, the computer 200 is adapted to execute computer program modules for providing functionality described herein. As used herein, the term "module" refers to computer program logic utilized to provide the specified functionality. Thus, a module can be implemented in hardware, firmware, and/or software. In one embodiment, program modules are stored on the storage device 208, loaded into the memory 206, and executed by the processor 202.

Embodiments of the entities described herein can include other and/or different modules than the ones described here. In addition, the functionality attributed to the modules can be performed by other or different modules in other embodiments. Moreover, this description occasionally omits the term "module" for purposes of clarity and convenience.

Figure 3:
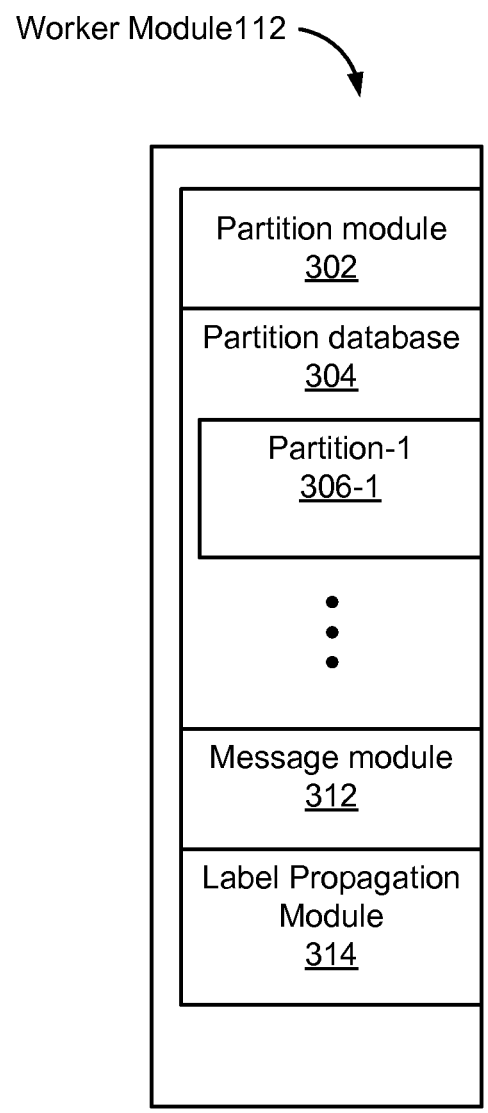
FIG. 3 is a high-level block diagram illustrating modules within a worker system, according to one embodiment.

FIG. 3 is a high-level block diagram illustrating modules within the worker module 112 of a worker system 106, according to one embodiment. In some embodiments, the modules retrieve one or more partitions of the graph stored on the distributed storage system 103, execute a copy of the user program, and modify the one or more retrieved partitions of the graph responsive to operations of the user program.

The worker module 112 includes a partition module 302 that manages the data in the partition database 304. The partition module 302 may retrieve one or more graph partitions and store the retrieved partitions in the partition database 304. In some embodiments, the partition module 302 retrieves the one or more graph partitions from the distributed storage system 103 based on information received from the client 102 and/or master system 105. In some embodiments, the partition module 302 receives information describing a partition of a graph and stores the information in the partition database 304. More specifically, the partition module 302 receives information identifying one or more graph partitions and the location of the graph partitions on the distributed storage system 103. The partition module 302 also saves the state of the partitions 306 in the partition database 304 in response to messages from the master system 105.

The partition database 304 stores information for one or more graph partitions 306 described above. The one or more graph partitions may be copies of graph partitions stored on the distributed storage system 103. In some embodiments, the partition database 304 stores information identifying the location of one or more graph partitions on the distributed storage system 103. A graph partition stores information for a subset of the vertices and edges of the directed graph.

The information for the vertices include vertex names and vertex values. In one embodiment, the vertex values include label values which measure a vertex's association with one or more vertex labels. The labels may be, e.g., arbitrary text strings and serve to describe a possible characteristic of the real-world item represented by the associated vertex. For example, if a vertex represents an item that can be colored red, green, or blue, the vertex may have three labels, which may in turn be represented by the strings "red", "green", and "blue." The labels may be, e.g., numbers where each number corresponds to a label.

A label value indicates the strength of a vertex's association with a label. For example, the label value may be a real number between, and including, zero and one. In this example, a label value of zero indicates that the vertex having the value has no association with the corresponding label, a label value of one indicates that the vertex has maximum association with the label, and label values between zero and one describe a degree of association between the label and the vertex. Different embodiments may ascribe different interpretations of the relationship among the vertex, label, and label value. For example, in one embodiment a label value of one may indicate that a vertex has the associated label, but a label value of less than one, or another threshold, indicates that the vertex does not have the associated label. Likewise, other embodiments may use label values that are not numbers. In one embodiment, each vertex of the graph maintains a vector that includes a position holding a floating point value for each of the possible labels.

The information for the edges includes edge destination names and edge values. An edge includes a label weight that affects how much each of a source vertex's labels affect the target vertex's corresponding label. For example, the label weight affects how much of a source vertex's label value for a first label affects the target vertex's label value for the first label. In some embodiments, an edge may store a plurality of edge weights, where each edge weight corresponds to a different label. More specifically, each label weight affects how much a source vertex label value affects a corresponding label value of a target vertex. For example, a first weight may correspond to a first label and a second weight may corresponds to a second label. As used herein, the combination of the label weight with the source vertex's label is referred to as the "weighted label value."

Different embodiments can represent the label weights and influence on label values in different ways. In one embodiment, a label weight implicitly or explicitly indicates a mathematical weighting function to perform on the source vertex's label value. For example, the weighting function may multiply the label weight with the label value of the source node to produce a weighted label value. Thus, if the label value of the target node is 1.0, and the label weight is 0.5, the weighted label value is 0.5. The weighting function may also be a floor or ceiling function, a threshold function, an averaging function, etc.

A message module 312 sends messages from one vertex to another vertex during a superstep. A vertex may send messages to another vertex on a different worker system 106. The vertices may send messages to other vertices in order to obtain information about other vertices, to add or remove vertices or edges, and to modify values associated with vertices and edges. In one embodiment, the message module 312 stores and manages message queues for all of the vertices in a partition. In some embodiments, the message module 312 maintains a single incoming message queue for all of the vertices in the partition or all of the vertices in all partitions assigned to a worker system 106. The messages include a message value and the name of the destination vertex. The message values may include weighted label values.

In some embodiments, the message module 312 stores and manages an outgoing message queue for all of the vertices in a partition. The messages in the outgoing message queue may be transmitted once the queue reaches a threshold size. The message module 312 is also responsible for sending and responding to messages from the master system 105. As discussed above, the master system 105 periodically sends messages to the worker systems 106 to check on the status of a computation.

The label propagation module 314 propagates vertex labels through the vertices of the graph partitions 306 stored in the partition database 304 according to a label propagation algorithm. As discussed above, the algorithm is performed as a series of iterations called supersteps. During each iteration, every active vertex performs a set of operations simultaneously which include receiving weighted label values from connected source vertices, updating its own labels values based on the received weighted label values, and sending updated label values adjusted by the weights of the edges to target vertices. Depending upon the embodiment, the label propagation module 314 may instruct a vertex to vote to halt when specified conditions are reached. For example, the algorithm might instruct a vertex to halt after a predefined number of supersteps are performed or after the label values for the vertex have not changed for a specified number of supersteps (e.g., the values have converged).

The label propagation module 314 updates the label values for the vertices of the graph partitions 306 stored in the partition database 304 based on any weighted label values received by the vertices. In one embodiment, the label propagation module 314 updates the value for a given label of a vertex by applying a mathematical updating function to the values of the received weighted label value and the existing label value for the vertex. The updating function may perform the same types of operations described above with respect to the weighting function. The result of the updating function is the updated label value for that label and vertex. For example, the updating function may produce the updated label value by averaging the existing value for a label with the received weighted value for the label.

The label propagation module 314 may save the output from the vertices to the distributed storage system 103. More specifically, the label propagation module 314 may save label values, label weights, and weighted label values to the distributed storage system 103. In some embodiments, the label propagation module 314 saves the output from the vertices to the partition database 304. The label propagation module 314 may assign labels to vertices and save the assignments to the distributed storage system 103. For example, the label propagation module 314 may save a file for a partition that includes the label assignment of the vertices in the partition.

Figure 4:
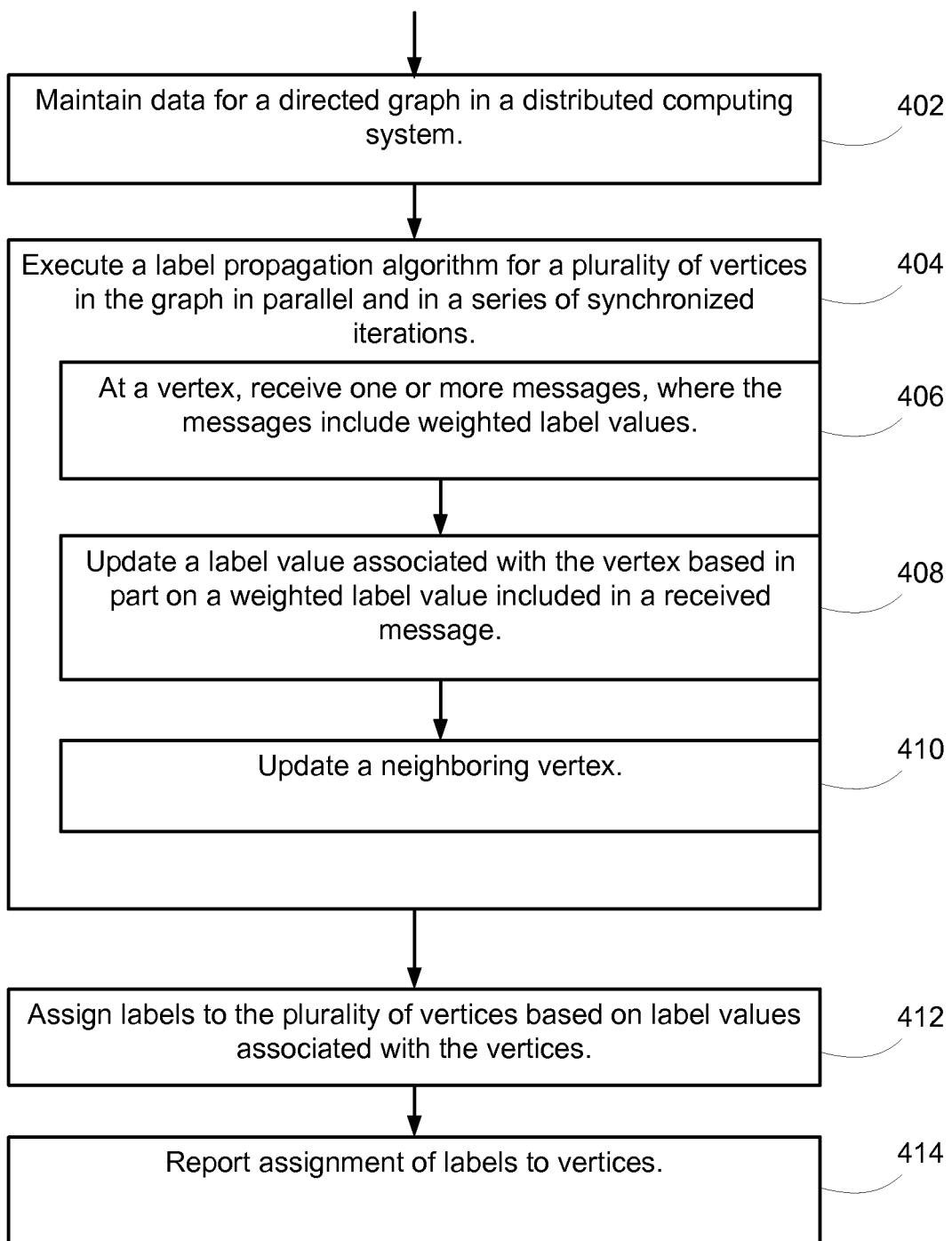
FIG. 4 is a flow diagram that illustrates a process for performing a label propagation algorithm on a directed graph, according to one embodiment.

FIG. 4 is a flow diagram that illustrates a process for performing a label propagation algorithm on a directed graph, in accordance with one embodiment. This process 400 is performed by a server system (e.g., worker system 106) having one or more processors and a non-transitory memory. The memory stores one or more programs to be executed by the one or more processors. The one or more programs include instructions for the label propagation algorithm.

In this process 400, data for a directed graph are maintained 402 in a distributed computer system. The data for the directed graph are maintained 402 in one or more graph partitions. The data describe a directed graph representing relationships among items. The directed graph has vertices and edges connecting the vertices. The vertices each include a set of labels and label values and the edges each include one or more label weights. In some embodiments, the directed graph models a real-world condition and may represent, for example, a geographic map, computer network, or social network. In some embodiments, the real-world condition is analyzed in order to solve one or more real-world problems associated with the condition. In some embodiments, the set of label values for a vertex are represented as a vector having a plurality of positions, where each position in the vector corresponds to a label in the set of possible labels and where each position in the vector stores a value indicating a label value for a corresponding label.

The label propagation algorithm is executed 404 in parallel for a plurality of vertices in the graph in a series of synchronized iterations. The label propagation algorithm propagates label values through the graph according to the label weights to ultimately assign labels to the vertices of the graph. In some embodiments, the label propagation algorithm is executed for each vertex in the graph in parallel. An iteration corresponds to a superstep discussed above.

In the algorithm, a vertex receives 406 one or more messages containing weighted labels values during an iteration. In one embodiment, the incoming messages received by the vertex are sent from source vertices that have outgoing edges to the vertex. The weighted label values received from a source vertex may correspond to one or more labels. The weighted label values are weighted by a label weight connecting the receiving vertex and the source vertex. In some embodiments, the incoming messages were sent in a previous iteration and received at the beginning of the current iteration.

The vertex updates 408 at least one of its label values based in part on the weighted label values received in the messages. More specifically, the vertex uses a mathematical updating function to determine an updated label value for one or more of its existing label values based on the existing label values, a user defined parameter, and the received weighted label values. In some embodiments, an updated label value for a label is expressed by the formula L+C1*Sum(M), where L is the current label value for the label, C1 is a user defined parameter, and Sum(M) is the sum of the weighted label values that correspond to the label and that were received in messages from other vertices. The user defined parameter (i.e., C1) affects how much of the updated label value comes from the existing label value versus the weighted label values. When the user defined parameter is large, the weighted label values from the received messages have a large influence on the updated label value. When the user defined parameter is smaller, the existing label value has a greater influence on the updated label value. The updated label value replaces the existing label value. In some embodiments, after updating its label values, a vertex normalizes its label weights so that they add up to one. More specifically, the vertex may modify the label weights of its outgoing edges so that they add up to one.

The vertex updates 410 a neighboring vertex. More specifically, the vertex sends an outgoing message to a neighboring vertex via one or more outgoing edges. An outgoing message includes one or more weighted label values. A weighted label value is an updated label value adjusted by a label weight associated with the outgoing edge that the message traverses. The vertex uses a weighting function on the updated label value and a label weight associated with an outgoing edge to produce a new weighted label value. For example, a weighted label value may be a product of an updated label value and a label weight. When an edge includes a single label weight, the label weight is applied to each label value. In some embodiments, an edge includes multiple label weights, where each label weight corresponds to a respective label and is applied to the corresponding label value. For example, if an edge includes label weight A and label weight B, label weight A is applied to updated label value A and label weight B is applied to updated label value B.

The algorithm terminates after a fixed number of iterations or when the vertex's label values do not change more than a predefined amount in the current iteration. The number of iterations and the predefined amount may be set by the user of the client device 102. For example, the user may specify the number of iterations and/or the predefined amount as input to the user program.

In one embodiment, after the algorithm terminates, the vertices of the graph are assigned 412 labels based on the label values associated with the vertices. For example, a vertex having a label value above a threshold value may be assigned a corresponding label. As the vertices correspond to real-world items, the labeling of vertices indicates a labeling of real-world items that represents a solution to the real-world problem associated with the conditions modeled by the graph. The assignment of labels to vertices representing the solution are reported 414 to the client 102 for storage, display and/or other purposes.

Figure 5A:
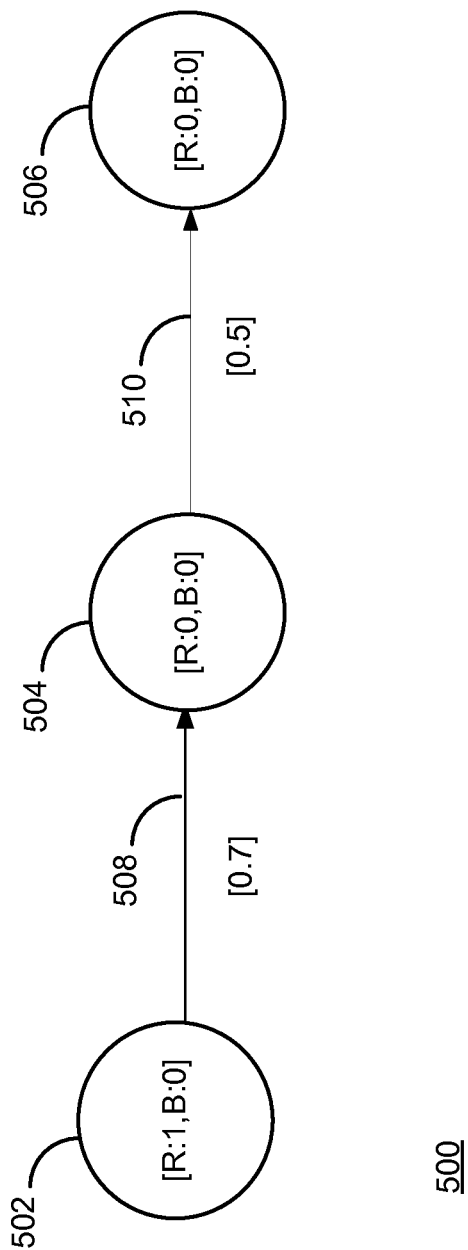
FIG. 5A-C illustrates an example of an iteration of the label propagation algorithm on a directed graph in a distributed system, according to one embodiment.
Figure 5B:
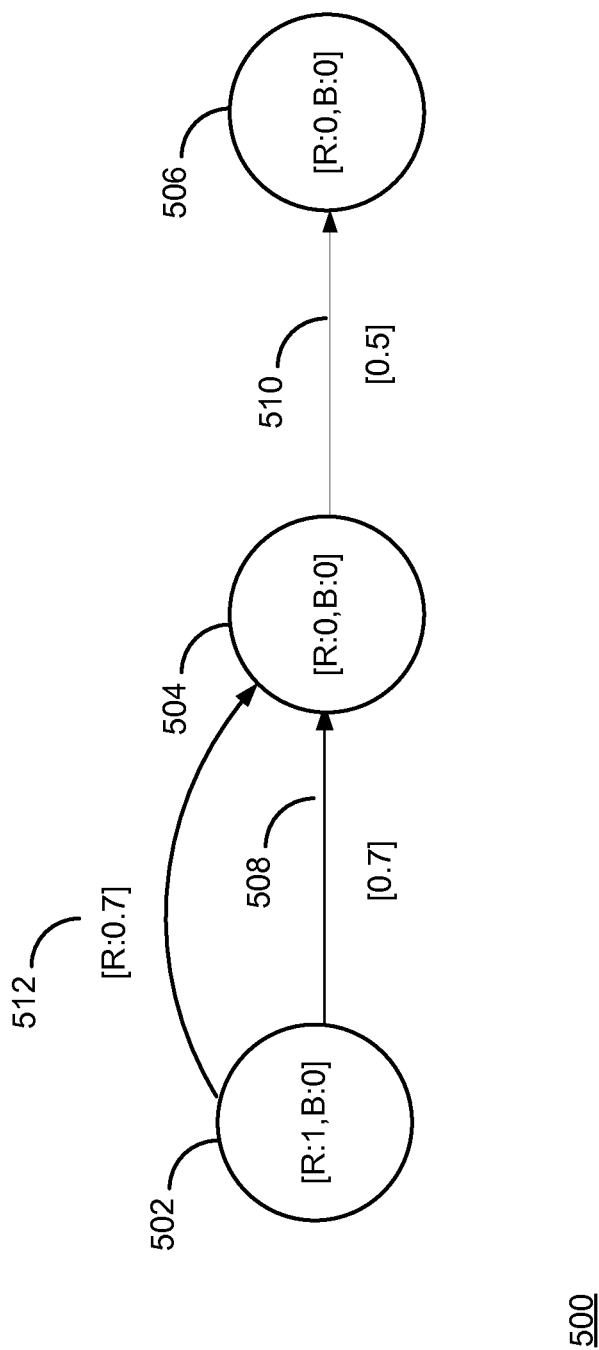
Figure 5C:
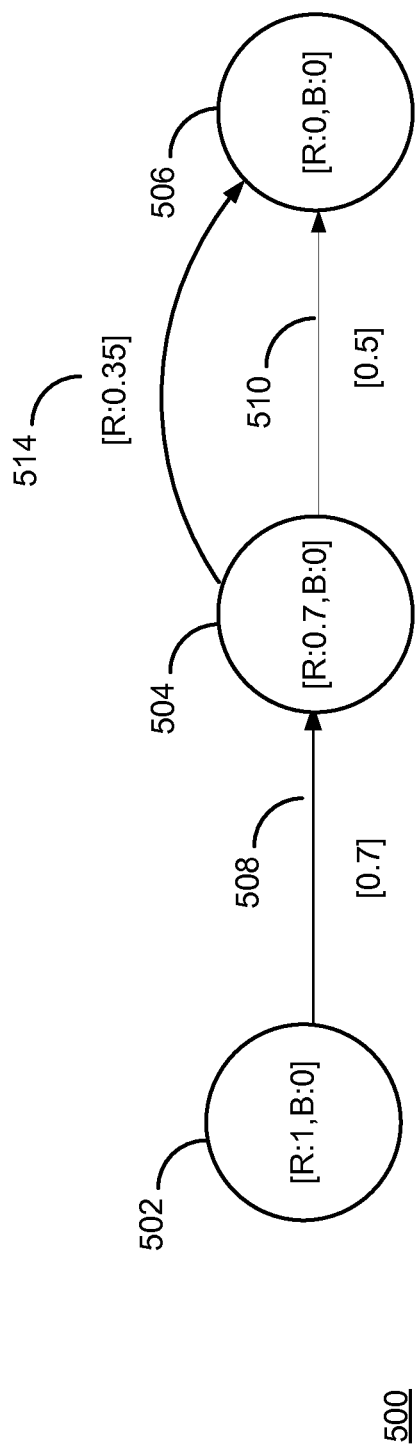

FIGS. 5A-5C illustrate the operations of an iteration of the label propagation algorithm on a directed graph 500. FIG. 5A shows directed graph 500 before the label propagation algorithm is executed. As shown in FIG. 5A, the directed graph 500 includes vertex 502, vertex 504, vertex 506, directed edge 508, and directed edge 510. The vertices include label values for a two labels, "R" and "B." As discussed above, the label values associated with a vertex measure the vertex's association with one or more labels. For example, vertex 502 includes a label value (i.e., 1) for the label "R" which measures the vertex's association with the label "R." The edges of the directed graph 500 include a label weight that determines how much of a vertex's label values affect another vertex's corresponding label values.

FIG. 5B illustrates the operations performed by vertex 502 during an iteration of the label propagation algorithm. In FIG. 5B, vertex 502 determines a weighted label value (i.e., R:0.7) based on a label value (i.e., R:1) associated with the vertex and the label weight (i.e., 0.7) of edge 508. Vertex 502 applies a weighting function to the label value (i.e., R:1) and the label weight (i.e., 0.7) to produce the weighted label value (i.e., R:0.7). In the example of FIG. 5B, the weighting function multiplies the label value (i.e., R:1) by the label weight (i.e., 0.7) to produce the weighted label value (i.e., R:0.7). Vertex 502 sends an outgoing message 512 to vertex 504 containing the weighted label value (i.e., R:0.7).

FIG. 5C illustrates the operations performed by vertex 504 in a subsequent iteration after vertex receives message 512. In FIG. 5C, vertex 504 performs an updating function on the weighted label value received in message 512 which was sent by vertex 502. Using the formula discussed above, vertex 502 determines an updated label value for label "R" by adding its current label value for label "R" (i.e., 0) to the product of a user defined parameter (e.g., 1) and the weighted label value (i.e. 0.7). In this example, the user defined parameter is set to one. Vertex 502 updates its label vale for label "R" to the updated label value (i.e., 0.7). In this particular example, the updated label value for label "B" would be zero since the received message does not include a label value for label "B" and vertex 502 has a label value of zero for label "B." After updating its label value with the updated label value, vertex 504 generates and sends a message 514 to vertex 506 containing a weighted label value. As discussed above a weighted label value is an updated label value adjusted by a corresponding label weight of an outgoing edge. Vertex 504 performs the operations described in the discussion of FIG. 5B to generate and send a message containing a weighted label value.

Some portions of the above description describe the embodiments in terms of algorithmic processes or operations. These algorithmic descriptions and representations are commonly used by those skilled in the data processing arts to convey the substance of their work effectively to others skilled in the art. These operations, while described functionally, computationally, or logically, are understood to be implemented by computer programs comprising instructions for execution by a processor or equivalent electrical circuits, microcode, or the like. Furthermore, it has also proven convenient at times, to refer to these arrangements of functional operations as modules, without loss of generality. The described operations and their associated modules may be embodied in software, firmware, hardware, or any combinations thereof.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the disclosure. This description should be read to include one or at least one and the singular also includes the plural unless it is obvious that it is meant otherwise.

Upon reading this disclosure, those of skill in the art will appreciate still additional alternative structural and functional designs for a system and a process for processing digital documents and reformatting them for display on client devices. Thus, while particular embodiments and applications have been illustrated and described, it is to be understood that the present disclosure is not limited to the precise construction and components disclosed herein and that various modifications, changes and variations which will be apparent to those skilled in the art may be made in the arrangement, operation and details of the method and apparatus disclosed herein without departing from the spirit and scope as defined in the appended claims.

What is claimed is:

1. A computer-implemented method executed by one or more processors, the method comprising:
    obtaining a set of vertices corresponding to a graphical representation of data from a distributed computing system, the set of vertices comprising a first vertex and a second vertex, the first vertex comprising a first label value indicating a strength of association between the first vertex and a particular label, the second vertex comprising a second label value indicating a strength of association between the second vertex and the particular label, the particular label representative of a characteristic of both the first vertex and the second vertex;
    obtaining an edge connecting the first vertex and the second vertex, the edge comprising an edge label value representative of a degree the first label value affects the second label value;
    receiving a message including an updated first label value for the first vertex, the updated first label value indicating an updated strength of association between the first vertex and the particular label;
    in response to the message including the updated first label value:
        replacing the first label value with the identified updated first label value;
        generating an updated second label value for the second vertex based on both the updated first label value for the first vertex and the edge label value for the edge connecting the first vertex to the second vertex, the generated updated second label value indicating an updated strength of association between the second vertex and the particular label; and
        replacing the second label value with the updated second label value;
    determining that the identified updated first label value exceeds a threshold value; and
    in response to the identified updated first label value exceeding the threshold value, assigning the identified updated first label value to the first vertex.

2. The method of claim 1, wherein the updated first label value is included in a set of label values associated with the first vertex, and the first vertex includes a set of labels including the particular label, the method further comprising:
    representing the set of label values for the first vertex as a vector having a plurality of positions, each position in the vector corresponding to a label in the set of labels and storing a value indicating a label value for the corresponding label.

3. The method of claim 1, wherein determining the updated second label value includes applying an updating function to the edge label value and the second label value.

4. The method of claim 1, wherein replacing the second label value with the updated second label value includes sending a message to the second vertex including the updated second label value.

5. The method of claim 1, wherein determining the updated second label value for the second vertex includes applying a weighting function to the edge label value and the updated first label value to produce the updated second label value.

6. The method of claim 1, further comprising:
    sending a message to a coordinating system indicating that the first vertex has completed an iteration of a series of synchronized iterations including replacing the first label value and the second label value; and
    receiving a signal to begin another iteration.

7. A system comprising:
    memory for storing data; and
    one or more processors operable to perform operations comprising:
        obtaining a set of vertices corresponding to a graphical representation of data from a distributed computing system, the set of vertices comprising a first vertex and a second vertex, the first vertex comprising a first label value indicating a strength of association between the first vertex and a particular label, the second vertex comprising a second label value indicating a strength of association between the second vertex and the particular label, the particular label representative of a characteristic of both the first vertex and the second vertex;
        obtaining an edge connecting the first vertex and the second vertex, the edge comprising an edge label value representative of a degree the first label value affects the second label value;
        receiving a message including an updated first label value for the first vertex, the updated first label value indicating an updated strength of association between the first vertex and the particular label;

in response to the message including the updated first label value:
> replacing the first label value with the identified updated first label value;
> generating an updated second label value for the second vertex based on both the updated first label value for the first vertex and the edge label value for the edge connecting the first vertex to the second vertex, the generated updated second label value indicating an updated strength of association between the second vertex and the particular label; and
> replacing the second label value with the updated second label value;

determining that the identified updated first label value exceeds a threshold value; and in response to the identified updated first label value exceeding the threshold value, assigning the identified updated first label value to the first vertex.

8. The system of claim 7, wherein the updated first label value is included in a set of label values associated with the first vertex, and the first vertex includes a set of labels including the particular label, the operations further comprising:
> representing the set of label values for the first vertex as a vector having a plurality of positions, each position in the vector corresponding to a label in the set of labels and storing a value indicating a label value for the corresponding label.

9. The system of claim 7, wherein determining the updated second label value includes applying an updating function to the edge label value and the second label value.

10. The system of claim 7, wherein replacing the second label value with the updated second label value includes sending a message to the second vertex including the updated second label value.

11. The system of claim 7, wherein determining the updated second label value for the second vertex includes applying a weighting function to the edge label value and the updated first label value to produce the updated second label value.

12. The system of claim 7, the operations further comprising:
> sending a message to a coordinating system indicating that the first vertex has completed an iteration of a series of synchronized iterations including replacing the first label value and the second label value; and
> receiving a signal to begin another iteration.

13. A non-transitory, computer-readable storage medium storing instructions operable when executed to cause at least one processor to perform operations comprising:
> obtaining a set of vertices corresponding to a graphical representation of data from a distributed computing system, the set of vertices comprising a first vertex and a second vertex, the first vertex comprising a first label value indicating a strength of association between the first vertex and a particular label, the second vertex comprising a second label value indicating a strength of association between the second vertex and the particular label, the particular label representative of a characteristic of both the first vertex and the second vertex;
> obtaining an edge connecting the first vertex and the second vertex, the edge comprising an edge label value representative of a degree the first label value affects the second label value;
> receiving a message including an updated first label value for the first vertex, the updated first label value indicating an updated strength of association between the first vertex and the particular label;
> in response to the message including the updated first label value:
>> replacing the first label value with the identified updated first label value;
>> generating an updated second label value for the second vertex based on both the updated first label value for the first vertex and the edge label value for the edge connecting the first vertex to the second vertex, the generated updated second label value indicating an updated strength of association between the second vertex and the particular label; and
>> replacing the second label value with the updated second label value;
> determining that the identified updated first label value exceeds a threshold value; and
> in response to the identified updated first label value exceeding the threshold value, assigning the identified updated first label value to the first vertex.

14. The non-transitory, computer-readable storage medium of claim 13, wherein the updated first label value is included in a set of label values associated with the first vertex, and the first vertex includes a set of labels including the particular label, the operations further comprising:
> representing the set of label values for the first vertex as a vector having a plurality of positions, each position in the vector corresponding to a label in the set of labels and storing a value indicating a label value for the corresponding label.

15. The non-transitory, computer-readable storage medium of claim 13, wherein determining the updated second label value includes applying an updating function to the edge label value and the second label value.

16. The non-transitory, computer-readable storage medium of claim 13, wherein replacing the second label value with the updated second label value includes sending a message to the second vertex including the updated second label value.

17. The non-transitory, computer-readable storage medium of claim 13, wherein determining the updated second label value for the second vertex includes applying a weighting function to the edge label value and the updated first label value to produce the updated second label value.

* * * * *